United States Patent [19]
Garey

[11] 3,899,199
[45] Aug. 12, 1975

[54] SELF-ALIGNING COUPLING
[75] Inventor: Robert B. Garey, San Jose, Calif.
[73] Assignee: Westinghouse Electric Corporation, Pittsburgh, Pa.
[22] Filed: Oct. 23, 1974
[21] Appl. No.: 517,116

[52] U.S. Cl. .............. 285/27; 285/101; 285/223; 285/321; 285/351; 285/371; 285/375
[51] Int. Cl.² ......................................... F16L 35/00
[58] Field of Search ............ 285/375, 95, 101, 108, 285/267, 223, 231, 165, 166, 370, 397, 371, 398, 351, 24, 27, 321, 133 A, 137 A, 302; 166/273, 237

[56]  References Cited
UNITED STATES PATENTS

| 2,390,892 | 12/1945 | McCormack | 285/101 |
| 2,480,529 | 8/1949 | Waag | 285/375 X |
| 2,744,484 | 5/1956 | Stockard | 285/27 X |
| 3,227,475 | 1/1966 | Sinkinson | 285/375 X |
| 3,291,442 | 12/1966 | Cranage | 285/101 X |

Primary Examiner—Dave W. Arola
Attorney, Agent, or Firm—F. J. Baehr, Jr.

[57]  ABSTRACT

A self-aligning coupling or packer stab connecting fluid passages in a remote controlled well casing connector for undersea production of oil or gas. The coupling having facilities for self-aligning and telescoping adjustment of its length.

10 Claims, 2 Drawing Figures

PATENTED AUG 12 1975 3,899,199

SELF-ALIGNING COUPLING

BACKGROUND OF THE INVENTION

This invention relates to self-aligning couplings and more particularly to a coupling joining well casings for the production of oil and gas from under the sea.

In the production of oil and gas from underneath the sea remote controlled connections to the well heads and other fluid passageways are required. Thus, to facilitate simultaneous multiple connections a self-aligning coupling, which will accomodate axial and angular misalignment of the fluid passageways as well as longitudinal variation between halves of the coupling and still produce leak free connection is a requisite for the undersea production of oil and gas.

SUMMARY OF THE INVENTION

In general, a coupling for joining openings of a first and second conduit in fluid communication, when made in accordance with this invention, comprises a sleeve having a central bore which registers with the openings in the conduits, the first conduit having a generally cylindrical counter bore for receiving one end of the sleeve, a device for retaining the sleeve in the counter bore in the first conduit, a device providing a seal between the sleeve and the first counter bore, the second conduit having a counter bore which has a generally cylindrical portion and a spherical portion inboard of the cylindrical portion, the sleeve having a body portion and a nose portion slidably disposed over a portion of the body. The coupling further comprises a device for forming a seal between the body and the nose portion. The nose portion has a spherical portion, which seats on the spherical portion and the counter bore in the second conduit. The coupling also comprises a device for forming a seal between the nose portion, the body portion and the bore in the second conduit and for biasing the nose portion toward the spherical portion in the counter bore.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
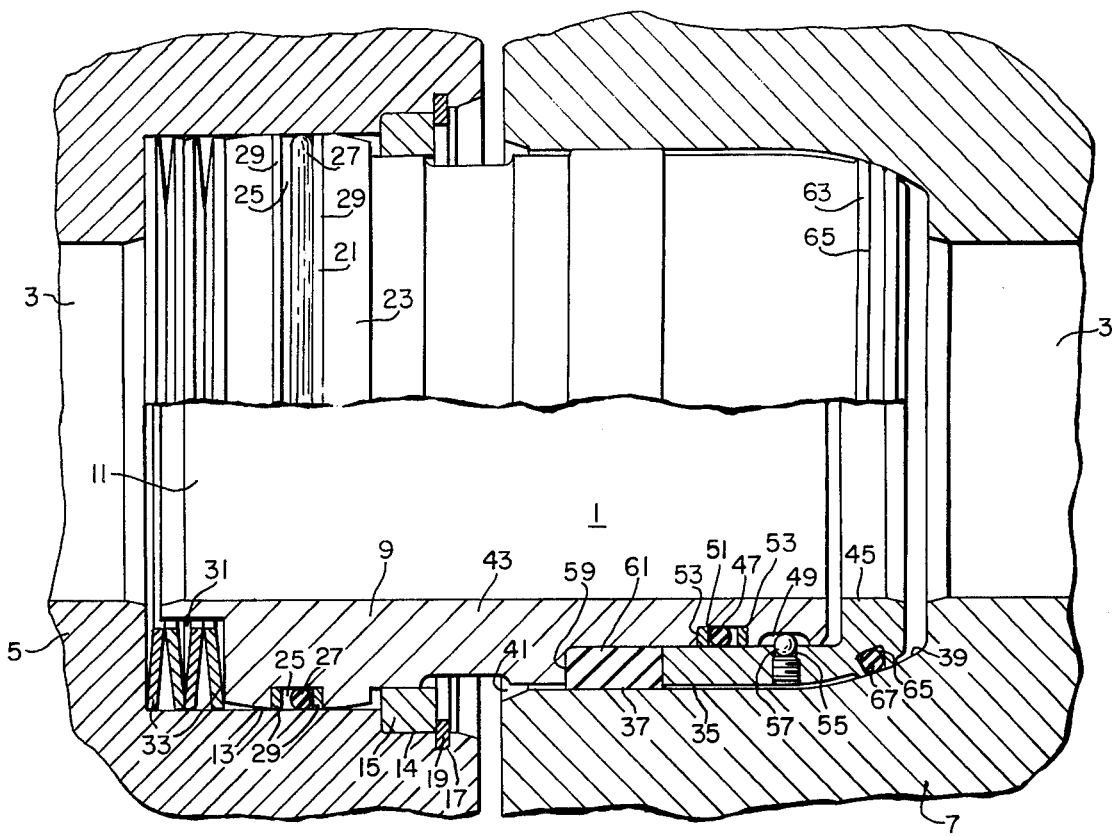
FIG. 1 is a partial sectional view of a coupling made in accordance with this invention.

Referring now to the drawings in detail and particularly to FIG. 1 there is shown a coupling or packing stab 1 utilized to join or connect openings or passageways 3 of a first and second conduit or well casings 5 and 7, respectively, in fluid communication.

The coupling 1 comprises a sleeve 9 having a centrall bore 11 which registers with the passageway 3 in the well casings 5 and 7.

The well casing or conduit 5 has a generally cylindrical counter bore 13 adapted to receive one end of the sleeve 9.

The outer end of the counter bore 13 is counter sunk as indicated at 14 to receive a retainer ring 15. A groove 17 is disposed in the counter sink outboard of the retainer ring 15 and is adapted to receive a snap ring 19, which locks the retainer ring 15 into the counter sink 14.

The sleeve 9 has a flange 21 disposed adjacent the one end. The flange 21 has a spherical outer surface 23 in order to provide some self-alignment of the sleeve 9 with respect to the counter bore 13.

The flange 21 also has a groove 25 adapted to receive an O-ring 27 made of an elastomer such as neoprene. Backup rings 29 formed from a material such as Teflon are disposed in the groove 25 on opposite sides of the O-ring 27 to prevent the O-ring 27 from being pinched or extruded into the clearance between the flange 21 and the counter bore 13.

The end of the sleeve adjacent the flange 21 has a turned down portion 31 and a stack of Belleville washers or dish-shaped springs 33 are disposed around the turn down portion 31 biasing the sleeve and flange 21 toward the retainer rings 15.

The second well casing or conduit 7 has a bore 35 adapted to receive the sleeve 9. The bore 35 has a cylindrical portion 37. Inboard of the cylindrical portion 37 is a spherical portion 39 and a tapered counter sunk portion 41 providing an enlarged opening to receive the sleeve 9.

The sleeve 9 has a turned down portion 43 adjacent the leading or other end thereof. A nose portion 45 is slidably disposed over the turned down portion 43. The turned down portion 43 has a pair of girthwise grooves 47 and 49 disposed therein. One of the grooves 47 is adapted to receive an O-ring 51 to form a seal between the turned down portion 43 of the sleeve 9 and the nose portion 45 thereof. A pair of backup rings 53 are disposed on either side of the O-ring 51 to prevent the O-ring from being extruded into the clearance between the turned down portion 43 and the nose portion 45 and being pinched therebetween.

The nose portion 45 has a groove 55 which registers with the groove 49 in the turned down portion 43 of the sleeve 9. The grooves 49 and 59 are adapted to receive a plurality of balls 57, which cooperate with the grooves 49 and 55 to retain the nose portion on the sleeve 9 and allow restricted axial movement therebetween.

The turned down portion 43 of the sleeve 9 has a step or shoulder portion 59 terminating the turned down portion 43. An elastomer seal 61 is disposed between the shoulder 59 and one end of the nose portion 45 forming a seal between the turned down portion 43, the nose portion 45 and the conduit or well casing 7. The nose portion 45 has a spherical surface 63 disposed adjacent the leading end thereof. The spherical surface 63 has a ring groove 65 disposed therein. An O-ring 67 is disposed in the groove 65 in order to form a seal between the nose portion and the well casing.

Figure 2:
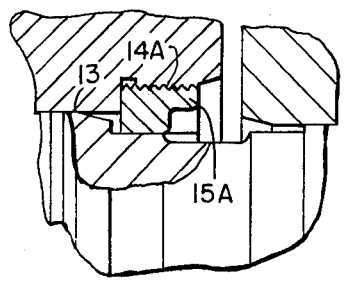
FIG. 2 is a partial sectional view showing an alternate retainer ring.

FIG. 2 shows an alternate retainer ring for holding the sleeve 9 in the first conduit 5. The counter sunk portion 14A of the counter bore 13 has internal or female threads and a retainer ring 15A has mating external or male threads, which allow the retainer ring to be screwed into the counter sink 14A in order to capture the sleeve 9 in the counter bore 13.

When operating the spherical surface 63 of the nose portion 45 engages or seats on the spherical portion 39 of the bore 35 in the conduit 7 forming a metal-to-metal seal which tolerates some misalignment. The O-ring 67 also presses against the spherical surface 39 forming a backup seal.

The Belleville washer springs 33 biases the sleeve 9 toward the spherical surface 39 in the counter bore 35 in the second conduit or well casing 7 into increase the sealing pressure. The cylindrical bore 13 and the flange 21 are larger in diameter than the bore 35 and nose portion 45 causing the fluid in the casing to exert a force on the sleeve 9 biasing it toward the spherical portion 39 of the counter bore 35 and thereby assisting the Belleville springs 33 to form a fluid tight seal between the spherical surfaces 39 and 63. This same force compresses the elastomer seal ring 61 causing it to press against the turned down portion 43 of the sleeve 9 and shoulder portion 59, the end of the nose portion 45 and the bore 35 of the well casing 7 forming a backup seal. Thus, the portions of the joint which are often assembled and disassembled and are subjected to the undersea envirmonment are provided with a plurality of seals which function effectively even though the well casing may be misaligned axially or angularly and have variation in their longitudinal dimension in order to facilitate multipassage connections, which may be remotely joined to produce oil and gas from undersea wells.

What is claimed is:

1. A coupling joining openings of a first and second conduit in fluid communication, said coupling comprising:

a sleeve having a central bore which registers with said opening in said conduits;

said first conduit having a generally cylindrical counter bore receiving one end of said sleeve, means for retaining said sleeve in said counter bore in said first conduit, means for forming a seal between said sleeve and said first counter bore;

said second conduit having a counter bore, which has a generally cylindrical portion and a spherical portion inboard of said cylindrical portion;

said sleeve having a body portion and a nose portion slidably disposed over a portion of said body portion, means for forming a seal between said body portion and said nose portion, said nose portion having a spherical portion, which seats on said spherical portion in said counter bore in said second conduit, and means for forming a seal between said nose portion, body portion and said counter bore in said second conduit and for biasing said nose portion towards said spherical portion in the second counter bore.

2. A coupling as set forth in claim 1, wherein said retaining means, said sealing means for said first conduit and said sleeve cooperate to allow axial movement between said sleeve and said first conduit.

3. A coupling as set forth in claim 2 and further comprising means for biasing said sleeve away from the bottom of said counter bore in said first conduit.

4. A coupling as set forth in claim 3, wherein the biasing means includes both fluid and spring means cooperating to produce a maximum biasing force when a pressurized fluid fills the conduit.

5. A coupling as set forth in claim 1, wherein the means for forming a seal between the sleeve and first counter bore is an O-ring.

6. A coupling as set forth in claim 1, wherein the means for retaining the sleeve in the counter bore comprises a flange disposed on the sleeve and a retainer ring held in the counter bore.

7. A coupling as set forth in claim 6, wherein the counter bore and retainer ring are threaded and the retainer ring screws into the counter bore.

8. A coupling as set forth in claim 6, wherein the counter bore has a groove disposed therein and a snap ring fit into the groove holding the retainer ring in the counter bore.

9. A coupling as set forth in claim 6, wherein the outer surface of the flange is spherical to prevent binding and to allow for some misalignment between the sleeve and the counter bore in the first conduit.

10. A coupling as set forth in claim 9, wherein the spherical surface on the flange has a groove disposed therein and an O-ring is disposed in the groove to provide sealing means between the sleeve and the counter bore in the first conduit.

* * * * *